(12) United States Patent
Schulte et al.

(10) Patent No.: US 8,612,078 B2
(45) Date of Patent: Dec. 17, 2013

(54) PARALLEL HYBRID ELECTRIC VEHICLE POWER MANAGEMENT SYSTEM AND ADAPTIVE POWER MANAGEMENT METHOD AND PROGRAM THEREFOR

(75) Inventors: Jurgen Schulte, Vestal, NY (US); Filippo Muggeo, Endwell, NY (US); Derek Matthews, Vestal, NY (US); Brendan Pancheri, Binghamton, NY (US); Erin T. Hissong, Vestal, NY (US)

(73) Assignee: BAE SYSTEMS Controls Inc., Johnson City, NY (US)

( * ) Notice: Subject to any disclaimer, the term of this patent is extended or adjusted under 35 U.S.C. 154(b) by 24 days.

(21) Appl. No.: 13/205,191

(22) Filed: Aug. 8, 2011

(65) Prior Publication Data

US 2013/0041530 A1   Feb. 14, 2013

(51) Int. Cl.
*B60W 20/00* (2006.01)

(52) U.S. Cl.
USPC .......................... 701/22; 180/65.21

(58) Field of Classification Search
USPC .................. 701/22, 36, 48; 180/65.21, 65.25, 180/65.265, 65.28, 65.285, 65.29
See application file for complete search history.

(56) References Cited

U.S. PATENT DOCUMENTS

| | | | |
|---|---|---|---|
| 5,667,029 A | 9/1997 | Urban et al. | |
| 5,820,172 A | 10/1998 | Brigham et al. | |
| 5,842,534 A | 12/1998 | Frank | |
| 6,116,363 A | 9/2000 | Frank | |
| 6,336,889 B1 * | 1/2002 | Oba et al. | 477/5 |
| 6,746,366 B2 | 6/2004 | Tamor | |
| 7,370,715 B2 | 5/2008 | Colvin et al. | |
| 2001/0011050 A1 | 8/2001 | Yamaguchi et al. | |
| 2002/0052677 A1 | 5/2002 | Lasson et al. | |
| 2002/0065165 A1 | 5/2002 | Lasson | |
| 2002/0065589 A1 | 5/2002 | Ostberg | |
| 2004/0206325 A1 | 10/2004 | Momcilovich et al. | |
| 2006/0016627 A1 | 1/2006 | Robertson | |
| 2006/0172843 A1 * | 8/2006 | Nada | 475/2 |
| 2006/0237247 A1 | 10/2006 | Severinsky et al. | |
| 2007/0078580 A1 | 4/2007 | Cawthorne et al. | |
| 2008/0125265 A1 | 5/2008 | Conlon et al. | |
| 2008/0127935 A1 | 6/2008 | Park | |
| 2008/0182722 A1 | 7/2008 | Colvin et al. | |
| 2008/0185198 A1 | 8/2008 | Jones | |
| 2008/0203966 A1 * | 8/2008 | Ward | 320/104 |
| 2008/0300743 A1 * | 12/2008 | Conlon et al. | 701/22 |

(Continued)

FOREIGN PATENT DOCUMENTS

| | | | |
|---|---|---|---|
| JP | 2007126081 A | 5/2007 | |
| JP | 2008179242 A | 8/2008 | |
| JP | 2008273460 A | 11/2008 | |

*Primary Examiner* — Jason Holloway

(74) *Attorney, Agent, or Firm* — Scully, Scott, Murphy & Presser PC

(57) ABSTRACT

A system, computer readable storage device and method for controlling torque in a hybrid electric vehicle. The method comprises determining a state of charge of an energy storage device, obtaining a reference state of charge, obtaining an error from a difference between the determined state of charge and the reference state of charge; and apportioning torque between a motor and an engine based upon the error. The motor is electrically coupled to the energy storage device and powered by the energy storage device. A state of charge (SOC) correction factor is determined based upon the error. The SOC correction factor is used to adjust a torque ratio of motor to engine torque that is determined for a given torque command.

3 Claims, 3 Drawing Sheets

(56) References Cited

U.S. PATENT DOCUMENTS

| | | |
|---|---|---|
| 2009/0076672 A1 | 3/2009 | Bajwa |
| 2009/0078481 A1* | 3/2009 | Harris .......................... 180/65.1 |
| 2009/0124450 A1 | 5/2009 | Silveri et al. |
| 2009/0157243 A1* | 6/2009 | Kim ................................ 701/22 |
| 2009/0240387 A1* | 9/2009 | Kawai et al. .................... 701/22 |
| 2011/0089904 A1* | 4/2011 | Ward ............................ 320/126 |
| 2011/0172867 A1* | 7/2011 | Yu et al. ......................... 701/22 |
| 2011/0212802 A1* | 9/2011 | Conlon et al. .................... 475/5 |

* cited by examiner

PARALLEL HYBRID ELECTRIC VEHICLE POWER MANAGEMENT SYSTEM AND ADAPTIVE POWER MANAGEMENT METHOD AND PROGRAM THEREFOR

CROSS-REFERENCE TO RELATED APPLICATION

This application is related to co-pending application entitled Method and Apparatus for Controlling Hybrid Electric Vehicles assigned to BAE Systems Controls Inc., the entirety of which is incorporated by reference.

FIELD OF THE INVENTION

This invention relates to hybrid electric vehicles. More specifically, the invention relates to a system and method for managing power discharged from an energy storage device in a hybrid electric vehicle.

BACKGROUND OF THE INVENTION

A parallel hybrid electric vehicle (HEV) uses two parallel power paths to provide the required torque for moving the vehicle. One of the parallel power paths include an electric motor which receives power from an energy storage device (ESD). The second path typically uses a combustion engine. Regulating the energy supplied from the ESD is essential for the viability of the HEV and to maximize fuel economy. A state of charge (SOC) for the ESD is usually controlled by providing an usage window, which is limited by an upper and a lower SOC value. The usage of ESD energy while operating in this window is not regulated. If the SOC drops below the lower SOC value, a controller causes the engine to recharges the ESD. However, this management method decreases the life of the ESD and may decrease the fuel economy performance of the vehicle.

SUMMARY OF THE INVENTION

Accordingly, disclosed is a system and method for managing the SOC of the ESD that increases the life of the ESD, relative to a non-regulated control and saves fuel by using energy for propulsion of the vehicle that has been previously recaptured.

Disclosed is a method for controlling torque in a hybrid electric vehicle (HEV). The method comprises the steps of determining a state of charge of an energy storage device, obtaining a reference state of charge, obtaining an error from a difference between the determined state of charge and the reference state of charge; and apportioning torque between a motor and an engine based upon the error. The motor is electrically coupled to the energy storage device and powered by the energy storage device.

The method further comprises the step of monitoring at least one operating parameter for the hybrid electric vehicle and adjusting the reference state of charge based upon the monitored at least one operating parameter.

The method further comprises the step of obtaining a state of charge correction factor based upon the error. The state of charge correction factor is stored in memory. The stored state of charge correction factor can be associated with a type of drive cycle such as, but not limited to, a city drive cycle or highway drive cycle.

The method further comprises the step of monitoring at least one operating parameter for the hybrid electric vehicle and adjusting the obtained state of charge correction factor based upon the monitored at least one operating parameter.

The method further comprises the steps of receiving a reset request indicating a reset condition with a new type of drive cycle, retrieving a state of charge correction factor associated with the new type of drive cycle, setting the state of charge correction factor to the retrieved state of charge correction factor and adjusting the motor torque contribution based upon the set state of charge correction factor.

The method further comprises the step of receiving a torque command or a change in torque command.

The torque of a motor and an engine is controlled by determining a ratio of power from the motor and power from an engine based upon the received torque command and adjusting said ratio based upon the state of charge correction factor.

The energy storage device is charged using regenerative braking. This increases the state of charge for the energy storage device. The motor uses only the charged energy from a regenerative braking without charging the energy storage device with power from the combustion engine.

The torque of a motor and an engine can be controlled by determining a torque contribution from the motor and from the engine based upon the received torque command and adjusting the motor torque contribution based upon the state of charge correction factor.

Also disclosed is a method for controlling a total torque in a hybrid electric vehicle having an energy storage device, a motor and a combustion engine. The motor is electrically coupled to the energy storage device and is powered by the energy storage device. The total torque is a function of a torque generated by the motor and the combustion engine. The method comprises the steps of: charging the energy storage device by only using energy from regenerative braking generated when the motor acts as a generator, receiving a torque command, and controlling the torque generated by the motor by powering the motor using the charged energy from the recuperative braking when the torque command is received.

Also disclosed is a computer readable storage device storing a computer readable program for causing a computer to execute a method for controlling the torque in a hybrid electric vehicle. The method comprises the steps of determining a state of charge of an energy storage device, obtaining a reference state of charge, obtaining an error from a difference between the determined state of charge and the reference state of charge, and apportioning torque between a motor and an engine based upon the error.

Also disclosed is a torque control system comprising a combustion engine, an energy storage device, a motor controller coupled to the energy storage device a motor/generator coupled to the motor controller and a system controller for apportioning torque between the motor/generator and the engine based upon a difference between a determined state of charge of the energy storage device and a reference state of charge.

BRIEF DESCRIPTION OF THE FIGURES

These and other features, benefits, and advantages of the present invention will become apparent by reference to the following figures, with like reference numbers referring to like structures across the views, wherein.

DETAILED DESCRIPTION OF THE INVENTION

Figure 1:
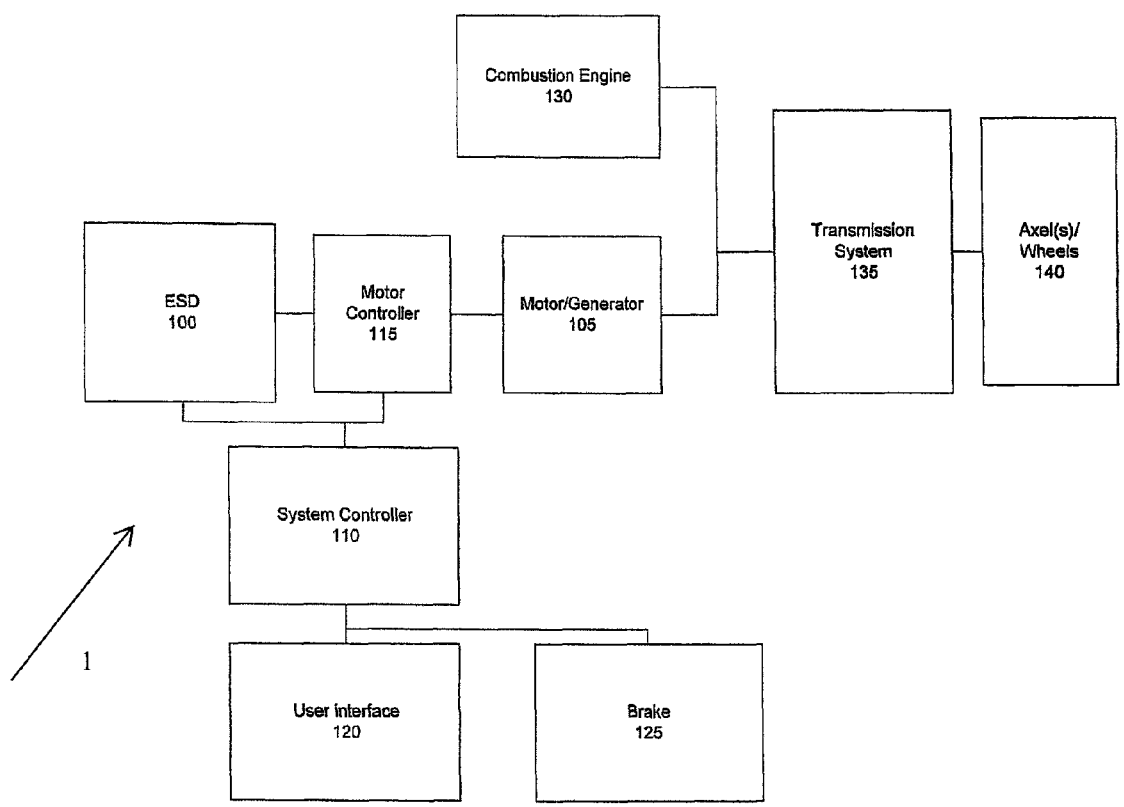
FIG. 1 illustrates an exemplary parallel hybrid electric vehicle management system according to the invention.

FIG. 1 illustrates an example of a parallel hybrid electric vehicle management system (parallel hybrid vehicle or HEV) 1 according to the invention. The parallel hybrid vehicle 1 includes two parallel power paths: a first path including an internal combustion engine 130 (hereinafter "engine") and a second path including electric motor 105. The engine 130 is of a conventional type that uses gasoline, diesel, bio-diesel, compressed natural gas (CNG), or other conventional fuel for initiating and sustaining combustion in one or more combustion chambers. As the workings of the engine 130 are well known in the art, the present disclosure will forego providing a detailed description of the operation of the engine 130 herein for brevity.

The engine 130 is mechanically coupled to a transmission system 135. The transmission system 135 provides driver-controlled or vehicle computer-controlled gear ratio selection from among at least one gear ratio depending on velocity, torque and acceleration requirements.

The electric motor/generator 105 receives electrical energy from energy storage device (ESD) 100, such as Lithium-Ion batteries, or other energy storage technologies capable of providing the necessary electrical power to the electric motor/generator 105. A motor controller 115 is provided to control the operation of the electric motor/generator 105. The motor controller 115 includes an inverter that converts the DC power from the ESD 100 into AC power for the motor/generator 105. The motor controller 115 is programmed with a program for executing control over the motor/generator 105. A system controller 110 controls the HEV 1. The system controller 110 determines the torque sharing or apportioning between each of the parallel paths, i.e., the amount of torque provided by the engine 130 and the motor/generator 105. Additionally, the system controller 110 provides feedback control for the torque sharing based upon a trend of the SOC for the ESD 100. The motor controller 115 receives the torque command from the system controller 110 and controls the motor/generator 105 to the specified torque.

The system controller 110 is programmed with a torque sharing method used to respond to a driver torque command, using a combination of the torque from the motor/generator 105 and the engine 130. The torque for the motor/generator 105 determined by the torque sharing method is adjusted by the system controller 110 using a feedback correction factor (which also effectively adjusts the torque of the engine). The feedback correction factor is used to allow the SOC of the ESD 100 to vary instantaneously over a predetermined reference range, but remain within this reference range over a drive cycle.

The system controller 110 adjusts a baseline torque sharing (determined by a torque sharing method) for both the motor/generator 105 and engine 130 using the feedback correction factor. For example, if the feedback correction factor indicates that the motor/generator 105 should use more energy, the torque determined for the motor/generator 105 will increase and/or command motor torque more often. On the other hand, if the feedback correction factor indicates that the motor/generator 105 should conserve energy, the torque determined for the motor/generator 105 will decrease and/or command motor torque less often. In other words, the instantaneous power or duration thereof supplied by the motor/generator 105 is adjusted.

The engine 130 can have a separate engine controller (not shown) which controls the torque of the engine in response to a torque command. The ESD 100 is configured to provide a voltage output adequate to drive the electric motor/generator 105 via the motor controller 115. The voltage output from the battery can be in the hundreds of volts, for example 325 Volts DC.

The system controller 110 is responsive to a torque command received from a driver via a user interface 120 such as an accelerator pedal or a brake command from the brake 125.

Additionally, during periods of deceleration, the motor controller 115 commands a negative torque from the motor/generator 105. In the deceleration situation, this configuration allows the electric motor/generator 105 to operate as an electric generator in order to recoup regenerative braking energy for recharging the ESD 100. The ESD 100 is charged by only using energy recouped from regenerative braking, and no power from the engine 130 is used to charge the ESD 100.

The system controller 110 continuously monitors a State of charge (SOC) of the ESD 100 and outputs a feedback correction factor to adjust the torque of the motor/generator 105 and engine 130 based upon the net energy flow (SOC) trend of the HEV 1. The system controller 110 includes a processing section and memory (both volatile and non-volatile memory). The system controller memory contains a program to determine a reference SOC value. A default reference SOC value is also stored in the memory. The reference SOC value can be constant, i.e., a specific reference point or a reference range having a upper and lower tolerance, i.e., operating zone. A specified constant reference SOC can vary based upon various factors, which can include, but is not limited to, type of vehicle, vehicle weight or type of ESD 110. The reference SOC can also be calculated using a reference plant model of the entire vehicle or subsystem of the vehicle. A reference plant model is known and will not be described herein in detail.

The system controller 110 determines a feedback correction factor using a determined error which is based on the difference between the current SOC and reference SOC range. The feedback correction factor represents whether the parallel hybrid vehicle 1 is trying to conserve or use more energy from the ESD 100. The feedback correction factor allows the actual SOC to vary within the entire reference SOC range in short periods of time, but adjust motor torque so that there is no net SOC increase/decrease over a long period of time on the same drive cycle. The feedback correction factor will vary over time; however, the variance will decrease and eventually stabilize.

The feedback correction factor is stored in the system controller memory, either continuously or during shutdown. Upon startup or reset, the system controller 110 can initialize the feedback correction factor to one of the stored feedback correction factors.

Figure 2:
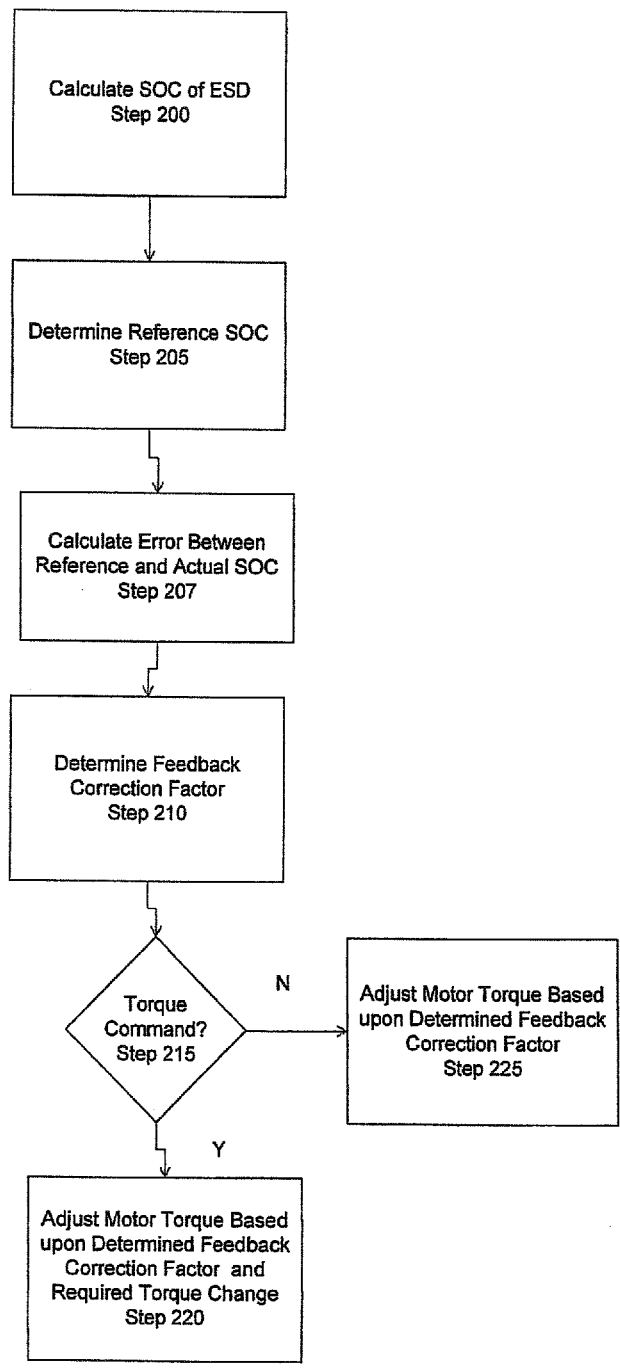
FIGS. 2 and 3 illustrate flow charts for managing power supplied to an electric motor according to the invention.
Figure 3:
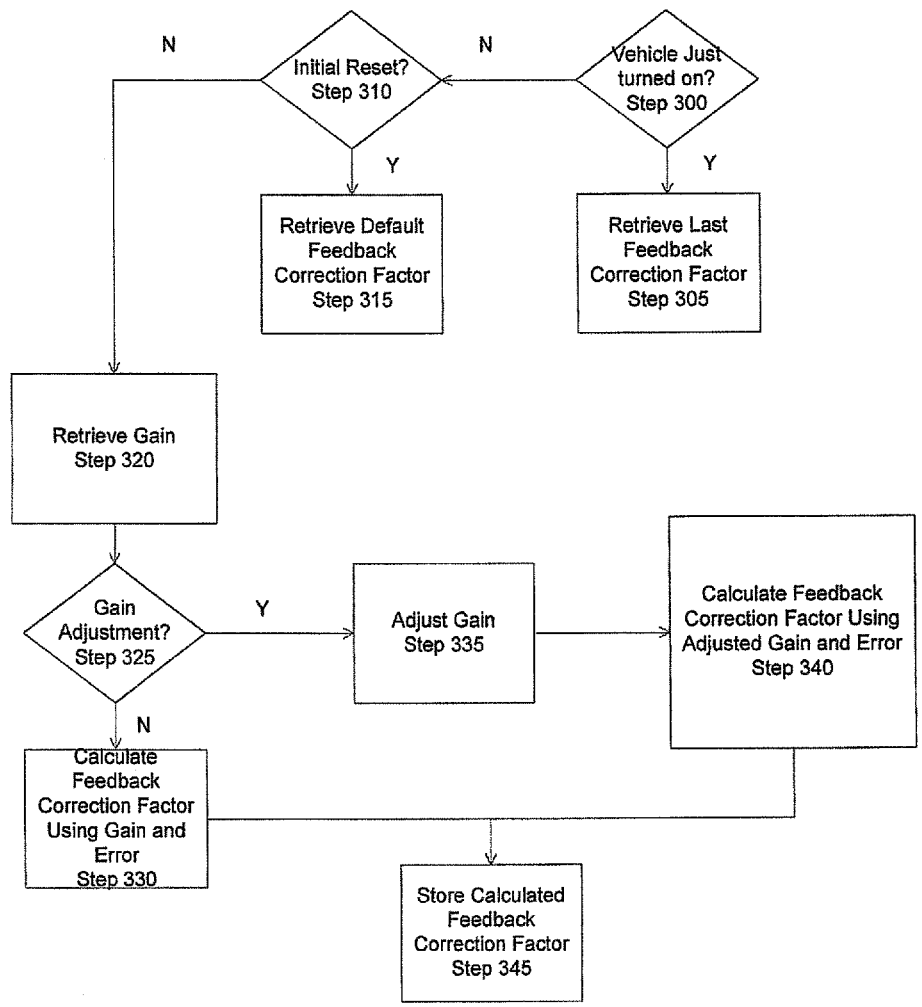

FIGS. 2 and 3 illustrate a method of managing the SOC of the ESD 100 and controlling the torque of the motor and engine in accordance with the invention.

At step 200, the SOC is calculated. The calculation is based upon battery parameters such as voltage or current. The calculated SOC is given as a percentage of full capacity. This calculation is continuously performed as the SOC is in constant flux due to discharge/charge of the ESD 100 depending on the operational mode of the motor/generator 105.

At step 205, the reference SOC is determined by being calculated or retrieved from memory. As noted above, the reference SOC can be a reference range. At step 207, the system controller 110 determines an error from the difference between the calculated SOC (from step 200) and the reference SOC (from step 205). At step 210, the system controller 110 determines a feedback correction factor using the error determined at step 207. The determination of the feedback correction factor will be described later in detail with respect to FIG. 3. The feedback correction factor is used by the system controller 110 to adjust the apportioning of torque between the motor/generator 105 and engine 130.

At step 215, the system controller 110 determines if a change in the drive torque demand or command was received via the user interface 120. If no change in the drive torque command was received, the total torque needed to satisfy the demand remains the same. Therefore, the torque sharing for the motor/generator 105 and engine 130 is only determined based upon the feedback correction factor, at step 225. If the feedback correction factor indicates that there was a net surplus in electrical energy (the SOC is at the high end or above the reference SOC), then the system controller 110 will increase the torque command to the motor controller 115. In other words, the system controller 110 will increase the torque sharing ratio of motor power to engine power or increase the duration of motor torque.

If the feedback correction factor indicates that there was a net deficit in electrical energy (the SOC at the low end or below the reference SOC), then the system controller 110 will decrease the torque command to the motor controller 115. In other words, the system controller 110 will decrease the torque sharing ratio of motor power to engine power or decrease the duration of motor torque. By effectively using the feedback correction factor to adjust the power/torque and/or duration of the torque for the motor/generator 105, the motor/generator 105 only uses energy that has been previously recaptured through regenerative braking to yield a charge sustaining torque sharing method.

If a new torque command was received via the user interface 120, system controller 110 determines the torque ratio needed to satisfy the new torque command, i.e., the change in total torque.

The motor power/torque and/or duration of the motor torque will be adjusted based upon both the feedback correction factor and the new torque command, at step 220. The determined torque ratio is a baseline ratio. The baseline ratio is adjusted using the feedback correction factor. If the feedback correction factor indicates that there is a surplus in electrical energy (as a result of having more charging of the battery via regenerative energy than discharging of the battery for powering the motor/generator 105, such that the SOC is at the high end or above the reference SOC range), then system controller 110 will increase the torque command to the motor controller 115, which will supply more power to the motor/generator 105 than would have been used, i.e., increase a baseline motor torque and decrease the engine power.

If the feedback correction factor indicates that there a net deficit in the current SOC (as a result of having more discharging of the battery for powering the motor/generator 105 than charging the battery via regenerative energy, such that the SOC is at the low end or below the reference SOC range), then the system controller 110 will decrease the torque command to the motor controller 115, which will supply less power to the motor/generator 105 than that would have been used, i.e., decrease the baseline motor torque and increase engine power. In this manner, maximum fuel efficiency for the vehicle, and extended life of the ESD 100 can be attained.

As described herein, the system controller 110 is used to control the torque ratio and torque of both the motor/generator 105 and engine 130; however, a separate engine controller can be used to control the engine 130.

FIG. 3 illustrates a flow chart for determining the feedback correction factor. At step 300, the system controller 110 determines if a vehicle has just been turned on, i.e., the timing in the drive cycle. As noted above, the system controller 110 stores a previously determined feedback correction factor in memory. When the vehicle is turned back on, the system controller 110 can initialize the feedback correction factor to whatever value it was before the vehicle was turned off, at step 305. The stored feedback correction factor is retrieved from memory and is set as the new feedback correction factor. This is particularly useful to vehicles that drive the same type of drive cycle each day. If the vehicle was not just turned on, the system controller 110 determines if an initial reset condition exists, at step 310. The initial resist condition can be an internal reset or an external reset. If a reset condition exists, then a default feedback correction factor is retrieved from memory (at step 315) and is used as the new feedback correction factor. The default feedback correction factor can be based upon a current vehicle parameter such as speed, estimated battery life, drive cycle conditions and/or an input from the driver. For example, a driver can control the HEV 1 to use one of the stored feedback correction factors via the user interface 120. Specifically, the driver may issue a reset to signal the system controller 110 to select a specific feedback correction factor based upon a type of drive cycle. In other words, the driver can inform the system controller 110 that the drive cycle has changed, e.g., city driving to highway driving and that the feedback correction factor should be reset to the stored feedback correction factor for the new type of drive cycle. Each of the stored feedback correction factors can be stored with an identifier. The identifier can be associated with a type of drive cycle. Therefore, when the driver inputs a reset with an identification of a drive cycle via the user interface 120, the system controller 110 can retrieve the associated feedback correction factor. Thus there can be a feedback correction factor stored for a city cycle and another for a highway cycle. For example, if a driver indicates that the drive cycle has switched to a highway cycle, the system controller 110 can initialize the feedback correction factor to a value previously stored in memory while the HEV 1 was on a highway route.

Alternatively, the determined drive cycle and other reset criterion can occur internal to the system controller 110.

The system controller 110 monitors the stability of the feedback correction factor. Once the feedback correction factor becomes stable, the system controller 110 will store the feedback correction factor for the specified drive cycle in memory as the default feedback correction factor for the drive cycle for later use.

If neither a vehicle turn on nor initial reset condition exists (N to both decision steps 300 and 310), then the system controller 110 retrieves variable control loop gains from memory at step 320. The variable control loop gains can be customized for the type of vehicle, weight, type of battery, etc. Additionally, the variable control loop gains can be adjusted based upon real time parameters such as, but not limited to, an estimated battery life. At step 325, the system controller 110 determines if the variable control loop gains need to be adjusted based upon continuously monitored current real time parameters. If the variable control loop gains need to be adjusted, they are adjusted at step 335. At step 330, the feedback correction factor is calculated using the variable control loop gains and the error. At step 340, the adjusted feedback correction factor is calculated using the adjusted variable control loop gains and the error. At step 345, the calculated feedback correction factor is stored in memory.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as "system."

Various aspects of the present invention may be embodied as a program, software, or computer instructions embodied in a computer or machine usable or readable medium, which causes the computer or machine to perform the steps of the method(s) disclosed herein when executed on the computer, processor, and/or machine. A program storage device readable by a machine, tangibly embodying a program of instructions executable by the machine to perform various functionalities and methods described in the present disclosure is also provided.

The system and method of the present invention may be implemented and run on a general-purpose computer or special-purpose computer system. The computer system may be any type of known or will be known systems.

The above description provides illustrative examples and it should not be construed that the present invention is limited to these particular examples. Thus, various changes and modifications may be effected by one skilled in the art without departing from the spirit or scope of the invention as defined in the appended claims.

What is claimed is:

1. A method for controlling a total torque in a hybrid electric vehicle having an energy storage device, a motor and a combustion engine, said motor being electrically coupled to said energy storage device and driven by said energy storage device, and where the total torque is a function of a torque generated by the motor and the combustion engine, comprising the steps of:
    charging said energy storage device by only using energy from regenerative braking generated when said motor acts as a generator;
    receiving a torque command; and
    controlling the torque generated by said motor by powering said motor using the charged energy from the regenerative braking when the torque command is received, wherein the total torque is controlled based on the received torque command and said combustion engine being on and contributing to the total torque.

2. The method for controlling a total torque in a hybrid electric vehicle according to claim 1, further comprising the steps of:
    determining a state of charge of the energy storage device;
    obtaining a reference state of charge;
    obtaining an error from a difference between said determined state of charge and said reference state of charge; and
    adjusting the torque generated by said motor based upon said error.

3. The method for controlling a total torque in a hybrid electric vehicle according to claim 1, further comprising the step of:
    controlling the torque generated by said combustion engine based on the received torque command and the torque generated by said motor.

* * * * *